April 16, 1929.  C. OFFENHAUSER  1,709,483
AUTOMOBILE BUMPER
Filed Jan. 26, 1928
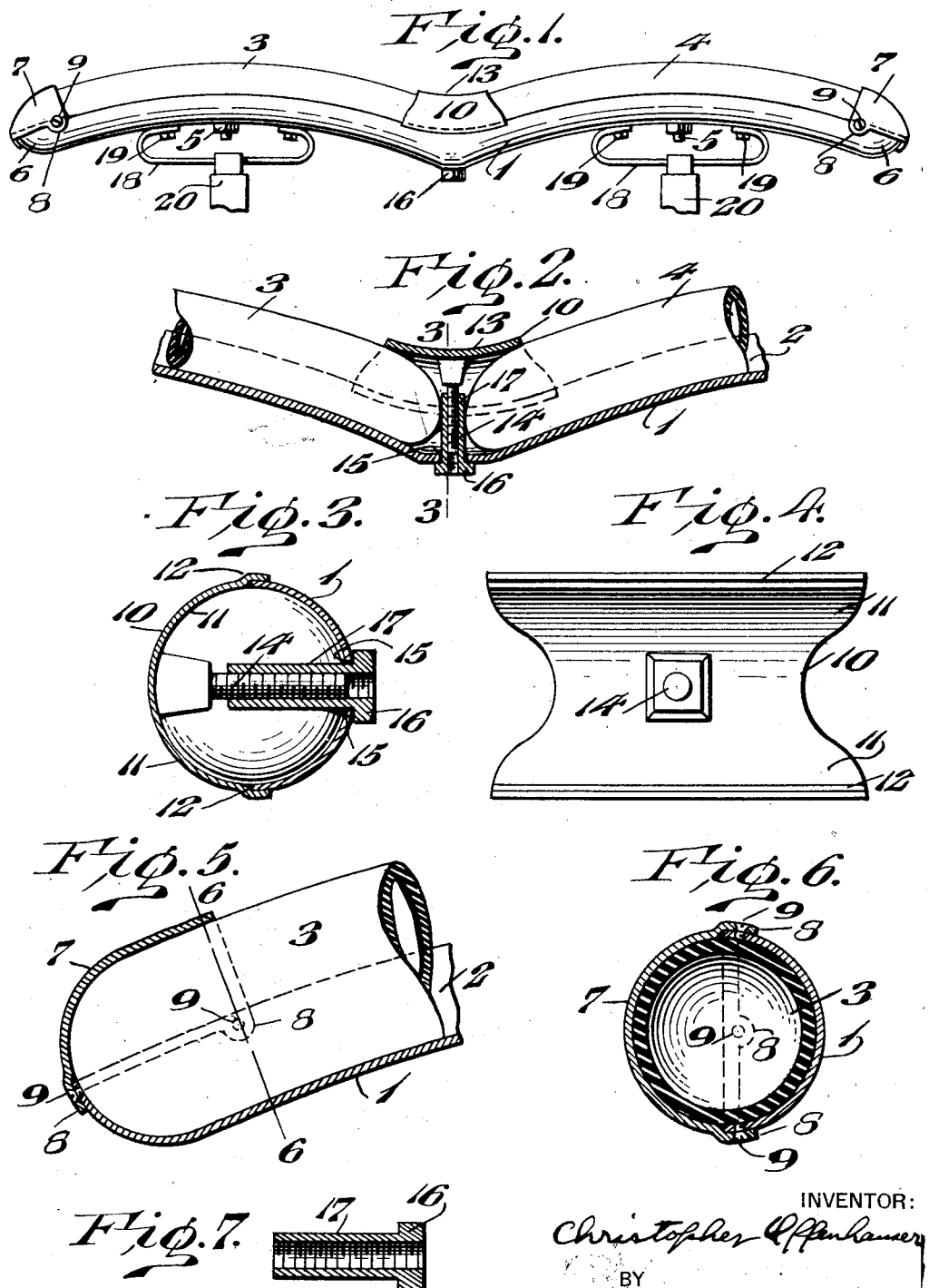
INVENTOR:
Christopher Offenhauser
BY
Herbert S. Fairbanks
ATTORNEY.

Patented Apr. 16, 1929.

1,709,483

UNITED STATES PATENT OFFICE.

CHRISTOPHER OFFENHAUSER, OF PHILADELPHIA, PENNSYLVANIA.

AUTOMOBILE BUMPER.

Application filed January 26, 1928. Serial No. 249,574.

In my prior Patent No. 1,561,184, patented November 10th, 1925, I have described and broadly claimed a novel construction and arrangement of an automobile bumper wherein the bumper has its contact portion formed by a plurality of inflated tubes which are retained within a central holder and end holders. The holders were resiliently carried by a spring bar adapted to be attached to the motor vehicle.

My present invention also employs a plurality of inflatable tubes forming contact members, but the tubes are carried in such a manner that if one becomes injured it can be readily replaced by the operator of the motor vehicle. In the construction shown in my prior patent it was found that there was some difficulty in removing and assembling the inflated tubes.

With the above in view my invention comprehends a novel construction and arrangement of an automobile bumper wherein a chambered casing is adapted to receive a plurality of inflated tubes, the casing being provided with a readily removable centrally disposed clamping member, and also with removable end caps.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 is a top plan view of an automobile bumper embodying my invention.

Figure 2 is a sectional plan view of the central portion of the bumper.

Figure 3 is a section on line 3—3 of Figure 2, on an enlarged scale.

Figure 4 represents a rear elevation of the central clamping member.

Figure 5 is a sectional view of the end portion of the bumper.

Figure 6 is a section on line 6—6 of Figure 5.

Figure 7 is a detail of the clamping mechanism.

Similar numerals of reference indicate corresponding parts.

Referring to the drawings:—

The casing 1 of the bumper is formed from a stamping and is semi-circular in cross section as indicated at 2. The bumper casing is also curved from a central portion towards each end. 3 and 4 designate inflatable tubes, each of which is provided with its respective air valve 5 which passes through an aperture in the casing 1. The casing 1, at each end, is curved outwardly as at 6 and adapted to receive a curved end cap 7 having the ears 8 which overlap the end portion 6 and are secured thereto by means of removable fastening devices 9, such as for example screws, as best seen in Figures 1 and 6.

The inner ends of the inflated members 3 and 4 are secured in position by means of the clamping member 10 which is readily detachable and which is provided with the curved sides 11 which are off-set as 12 in order to overhang the juxtaposed portion of the casing 1, as will be understood by reference to Figures 1 and 4.

The front face of the clamping member 10 is curved as at 13, see Figure 1, in order to blend with the curvatures of the inflatable impact members 3 and 4. The clamping member 10 has preferably rigid with it a rearwardly extending post 14 which passes between the juxtaposed ends of the contact members 3 and 4 and through an aperture 15 in the casing 1 and is secured in position by means of a nut 16 provided with an internally threaded sleeve 17.

It will be understood that each inflatable tube consists of a straight tube made of fabric and rubber or its equivalent, vulcanized together and provided with an inflating valve. The ends of a tube are rounded and it will be seen that by removing the end caps 7 one or both of the tubes can be readily removed when the central clamping member 10 is removed.

The bumper casing 1 has secured to it the ends of the springs 18 by means of fastening devices 19 of any desired character, and these springs 18 are secured in any desired or conventional manner to the springs or chassis 20 of the automobile.

The inflatable tubes 3 and 4 which form the impact portions of the bumper may be reinforced in any desired manner and they may be formed in straight sections or curved sections to fit the contour of the casing 1.

The inner face of impact member 3 or 4 may, if desired, be provided with a layer of non-vulcanizing material so that the impact member will be self healing if punctured. It will be seen that I employ a plurality of bowed inflatable impact members which are carried by the casing 1 which is formed from a steel stamping and has inherent in it a certain amount of resiliency to absorb and compensate for the shocks to which it is subjected. The shocks and stresses are also taken up and absorbed by the springs 18 which form a resilient mounting for the casing.

The casing and the inflated contact members each form an arch construction so that in the majority of cases when the bumper contacts with an object the shocks and stresses are absorbed by both of the inflated members, their casing and its resilient support.

In case one of the impact members becomes injured it can readily be replaced by removing the central clamping member and an end cap 7 and inserting a new impact member in place and reassembling the central clamp 10.

It will be apparent that the central clamp 10 can be removed by releasing the nut 16, and it can be readily inserted in place so that when it is secured in its clamped position the juxtaposed ends of the impact members will be securely clamped to the walls of the casing 1.

It will now be apparent that I have devised a new and useful automobile bumper which embodies the features of advantage enumerated as desirable in the statement of the invention and the above description, and while I have, in the present instance, shown and described a preferred embodimet thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. An automobile bumper comprising a longitudinally extending casing substantially semi-circular in cross section, and of arch formation longitudinally on opposite sides of its central portion, a pair of inflatable impact members seated in said casing, end caps to secure the outer ends of said members to said casing, and a detachable centrally disposed clamping member adjustably carried by said casing to secure the inner ends of said members with respect to said casing.

2. An automobile bumper comprising a casing having an arch formation longitudinally on opposite sides of its center and having a curved contour in cross section, end caps detachably connected at the ends of said casing, inflatable tubes having their outer ends within said end caps and juxtaposed portions of the casing, a central clamping member adapted to overhang the casing and embrace the juxtaposed inner ends of said tubes, springs secured to said casing, and adapted to be connected to suitable portions of an automobile.

3. An automobile bumper comprising a casing recessed on its front face, of arch formation longitudinally on opposite sides of its center and of a curved contour in cross section, with its outer ends curved inwardly, end caps detachably connected with said outer ends, a central clamping member of curved formation in cross section and having portions adapted to overhang said casing, said clamping member being provided with a threaded stud adapted to pass through said casing, a nut having a threaded sleeve engaging said stud for causing said clamping member to be adjustably connected with said casing, and resilient impact members detachably secured in position by said end caps and said clamping member, which latter overhangs juxtaposed inner ends of said impact members.

CHRISTOPHER OFFENHAUSER.